April 10, 1951        H. F. GEORGE        2,548,105
COLLAPSIBLE TOP FOR TRANSPORTATION DEVICES AND THE LIKE
Filed July 2, 1948        3 Sheets-Sheet 1
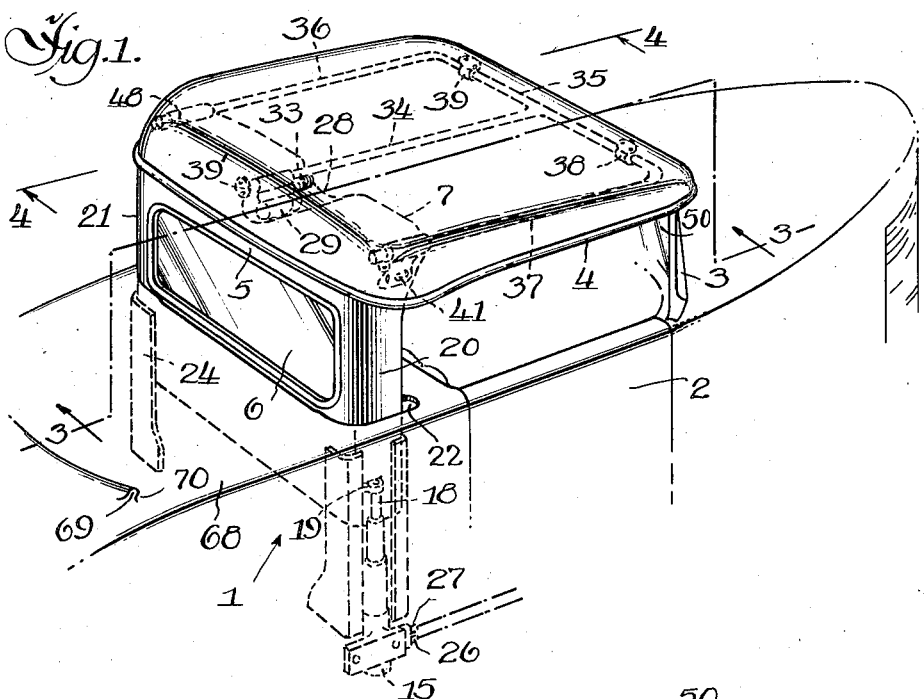
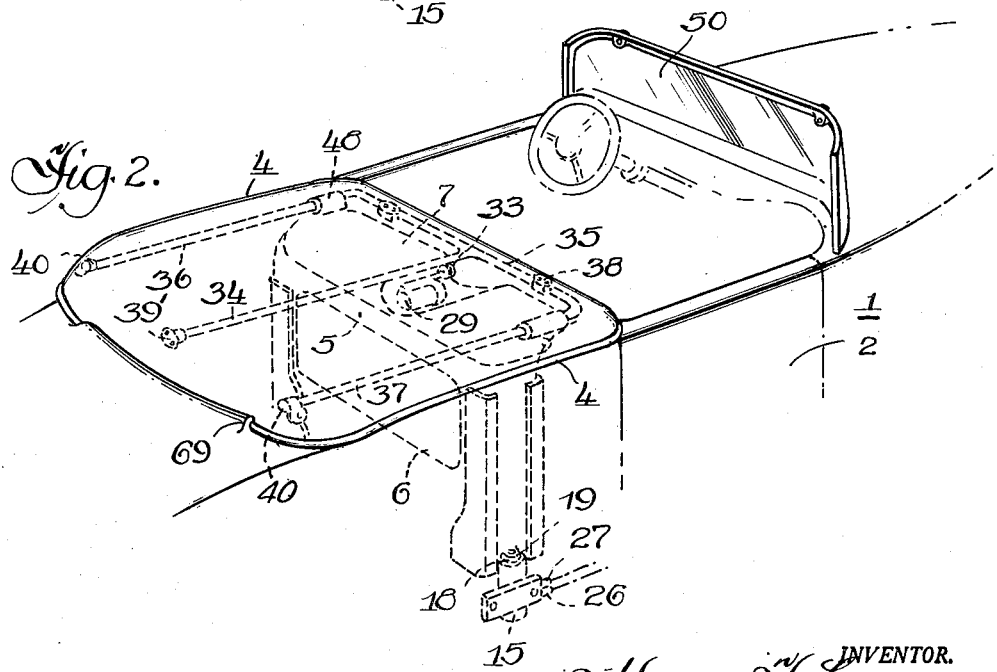
INVENTOR.
Harry F. George,
BY
Chritton, Schroeder, Merriam
& Hofgren.
Attys.

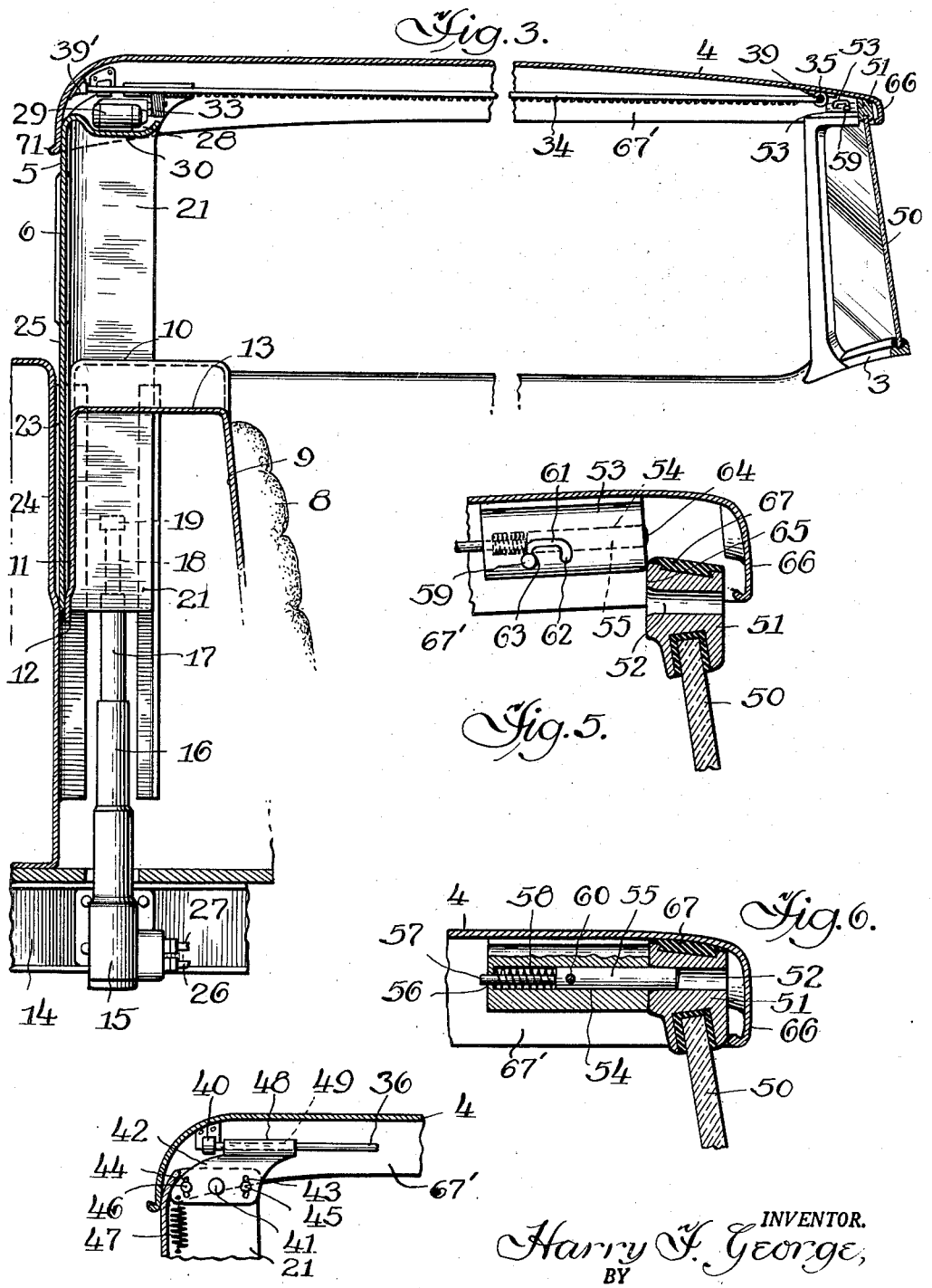

April 10, 1951 H. F. GEORGE 2,548,105
COLLAPSIBLE TOP FOR TRANSPORTATION DEVICES AND THE LIKE
Filed July 2, 1948 3 Sheets-Sheet 3
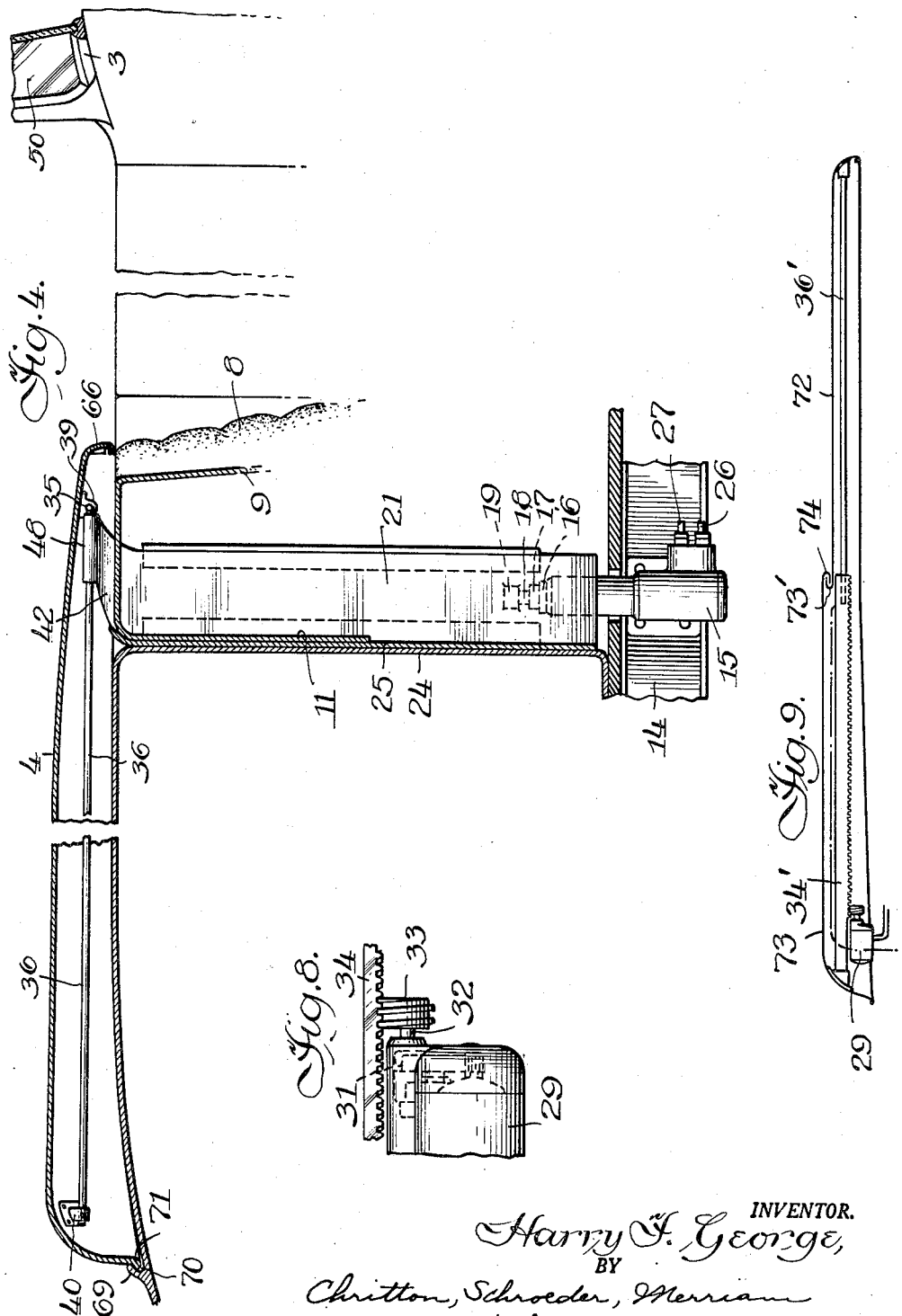

Patented Apr. 10, 1951

2,548,105

UNITED STATES PATENT OFFICE 2,548,105

COLLAPSIBLE TOP FOR TRANSPORTATION DEVICES AND THE LIKE

Harry F. George, Chicago, Ill.

Application July 2, 1948, Serial No. 36,710

8 Claims. (Cl. 296—137)

This invention relates to a collapsible top for transportation devices and the like, and more particularly to a top of durable construction which may be selectively moved in vertical directions as well as horizontal directions for covering and uncovering the seat or seats of an automobile, boat, or other transportation device.

The tops in automobiles and the like of the convertible type have been unsatisfactory because of being of too short a life, too light and of nonsufficiently sturdy construction, as well as being unsatisfactory in operation, not sufficiently durable, and limited to crushable material in the top which rapidly deteriorates. In the present invention I have overcome the above objections by providing a top for transportation devices and the like which top is movable forwardly and rearwardly in an approximately horizontal direction, as well as vertically upwardly and downwardly so as to have the top available for protecting the occupant or occupants of the seat or seats, and enable such top to be moved rearwardly and then downwardly to be seated against a rear extension behind the occupants' seat. Also in the present invention I have provided a top of sturdy and rigid construction that will protect the occupants from falling objects, and which will permanently retain its shape and be movable to and from its raised position without bending, flexing, or crushing.

Among the objects of my invention are: to provide a novel and improved collapsible top for transportation devices and the like; to provide a top of the type referred to which may be easily and quickly moved rearwardly to uncover the seat and then downwardly to out of the way position; to provide a top of the type referred to having a vertically movable top-supporting frame with means for moving the top horizontally; to provide a top of the type referred to having power means for selectively moving the top vertically as well as horizontally; to provide a top of the type referred to in which the front edge stands upwardly a sufficient distance to clear the top of a windshield frame, after which it may be pulled down and releasably latched with relation to the windshield; to provide a top of the type referred to having novel operating means for moving the top forwardly and rearwardly; to provide novel means for raising and lowering the top while in a substantially horizontal position, with relation to the body of the device to which it is attached; and such further objects, advantages and capabilities, inherently possessed by my invention, as will later more full appear.

My invention further resides in the combination, construction and arrangement of parts illustrated in the accompanying drawings, and while I have shown therein a preferred embodiment, I wish it understood that the same is susceptible of modification and change without departing from the spirit of my invention.

In the drawings:

Fig. 1 is a fragmentary perspective view of an automobile or the like having applied thereto a collapsible top embodying my invention, and showing the top in raised and forward position.

Fig. 2 is a view similar to Fig. 1 but showing the top moved rearwardly and lowered to inoperative position.

Fig. 3 is an enlarged vertical longitudinal section on the line 3—3 of Fig. 1.

Fig. 4 is a fragmentary longitudinal vertical section on the line 4—4 of Fig. 1, but showing the top as moved rearwardly and lowered to inoperative position.

Fig. 5 is an enlarged fragmentary vertical section through the front edge portion of the top and the upper portion of the windshield, with the front edge of the top swung only partially downwardly and before being latched to the windshield.

Fig. 6 is a view similar to Fig. 5 but showing the parts after the front edge of the top has been swung downwardly to final position and latched to the windshield.

Fig. 7 is a fragmentary longitudinal vertical section showing the connection between the top end of one side of the top-supporting frame, and the rear end portion of the top, this section being taken in the plane of line 4—4 in Fig. 1.

Fig. 8 is a fragmentary enlarged side elevation of a rack fixed to the top, and a motor and gear for moving said rack to operate the top in a horizontal direction.

Fig. 9 is a longitudinal vertical diagrammatic section of a modified form of collapsible top embodying my invention, and showing the same for use on an automobile or the like having more than one seat.

In the drawings, for illustrative purposes, my invention is shown as applied to an automobile or the like having a body 1, side doors 2, a windshield 3, a top 4 and a top-supporting frame 5, the latter being provided with a rear window 6 and a forwardly extending plate or flange 7 for supporting part of the top operating mechanism. The automobile, boat, or other transportation device is provided with the usual seat having the cushioned back rest 8 positioned in front of the metallic back member 9 forming the rear of the seat portion of the device. This seat back member 9 extends upwardly and then rearwardly to provide a top portion 10 which then extends downwardly at 11 and at its bottom edge is slightly curved rearwardly to provide a resilient lip 12 for a purpose hereinafter more fully explained. The top 10 of the back portion of the seat is at its central portion, transversely of the automobile or the like, formed with a curved depression, the bottom wall of which is shown at 13 in Fig. 3.

Fixed at each side of the vehicle body preferably on each of the chassis side frames 14 is a hydraulic hoist cylinder 15 in which is telescopically mounted the plurality of piston rods 16, 17 and 18 which are of progressively smaller diameter to enable them to telescope one into the other when the pressure in the cylinder is relieved, and to be extruded therefrom when the pressure is applied against a piston within the cylinder. The upper section 18 of the piston rod is fixed in any suitable manner at 19 to the lower end portion of one of the vertically extending side members 20 and 21 of the top-supporting frame 5, it being understood that there is preferably one of these hoists on each side of the vehicle body. The vertically extending portions 20 and 21 of the top-supporting frame 5 are each vertically slidable in a well 22 formed in the back portion of the seat and extending through an opening in the top thereof. There is formed one of these wells on each side of the seat back portion, each of which wells joins with the cross passageway 23 formed between the rear wall 11 of the seat back portion and the front wall 24 of the back luggage compartment of the vehicle.

As will be understood from the above, the vertically extending side portions 20 and 21 of the top-supporting frame, move vertically in the wells or openings 22, and the back portion 25 and the rear window 6 slide vertically in the space 23 back of the seat back portion. In order to prevent any rattling or looseness the bottom edge of the top-supporting frame back 25 is held slidably but snugly against the front wall 24 of the rear compartment as seen in Fig. 3, but yet permitting a vertical movement of said back portion 25 therebetween as the top is raised and lowered. Connected to have communication with the interior of the hydraulic hoist cylinder 15 is a supply pipe 26 for supplying fluid pressure to the inside of the hoist cylinder 15, and a return pipe 27 for permitting return of the fluid from the cylinder to any desired reserve tank when the pressure in the cylinder is relieved. From this structure it is seen that by manipulation of a throttle valve or other suitable handle, conveniently located in the automobile, the operator may by turning such handle either raise or lower the top 4 through the medium of the hoist cylinders 15. The hoist is shown in extended position in Fig. 3 with the top raised, and in a lowered position in Fig. 4 with the top down and moved rearwardly. The top-supporting frame at its upper end is extended forwardly to form the flange 7 and in its central portion laterally of the vehicle is formed with a depression or valley 28 to receive the power means for moving the top forwardly and rearwardly in an approximately horizontal plane. This power means as will be understood in Fig. 3 comprises an electric motor 29, mounted in any suitable manner upon the floor 30 of said depressed portion 28. As will be better understood in Fig. 8 the motor 29 is provided with reduction gearing shown generally at 31 which reduction gearing is connected to drive a shaft 32 upon which is fixed to rotate therewith a worm gear 33 in engagement with complemental teeth in the rack 34.

Rack 34, as will be seen in Fig. 3 constitutes the central leg of a three-legged yoke member 35, which at its outer ends extends rearwardly in the form of longitudinally extending legs 36 and 37. This yoke 35 with its three legs 34, 36 and 37 is fixed to the front and rear edge portions of the top in any suitable manner, as for example by being fixedly held in keepers 38 and 39 in the front portion of the top, and by being fixed in the socket member 39' in the rear edge portion of the top for the rack bar 34, and in socket members 40 (one on each side of the top) for the yoke legs 36 and 37. This rigidly fixes the yoke with its rack 34 and rearwardly longitudinally extending legs 36 and 37 in the top for movement therewith as later more fully explained.

Each of the vertical extending side portions 20 and 21 of the top-supporting frame 5, at its upper end has pivotally connected therewith by pin 41 a connecting plate 42 formed at opposite sides of pin 41 with short arcuate slots 43 and 44 slidable for restricted amounts upon pins 45 and 46 fixed in the side of the vertical portion of the top-supporting frame. A coil spring or the like 47 is fixed at one end to the rear end of plate 42 and at its other end to one of the vertical side members 20 and 21 of the top-supporting frame. This normally tends to tilt the top in a counterclockwise direction as viewed in Figs. 3, 4 and 7, this amount of tilting however being small in extent. Fixed to the upper forward portion of each of connecting plates 42 is a tubular guide member 48, through the longitudinally extending bore 49 of which slides the respective one of said legs 36 and 37. Fig. 7 shows leg 36 as having been moved through the tubular guide member 48 forwardly to its extreme forward position, and Fig. 4 shows the same as having been moved through this tubular guide member to its rearmost position.

The windshield member 3 is formed with the usual glass members 50 mounted in a marginal frame 51 within the upper member of which, as seen in Fig. 5, is formed the horizontally extending hole 52, any suitable number of these holes, at any suitable locations, being used as desired. Fixed at one or more positions, as desired, to the lower forward edge surface of the top 4 is one or more guide members 53, each formed with a longitudinally extending hole 54 within which is slidably mounted a latch pin 55. Hole 54 at its rear end, see Figs. 5 and 6, is reduced in diameter to provide a smaller opening 56 to slidably receive the longitudinally extending pin 57 fixed to latch pin 55. Surrounding pin 57 behind the latch pin is a coil spring 58 which normally tends to urge the latch pin 55 to the right as viewed in Fig. 6, but permit movement of this latch pin to the left upon rearward pressure being exerted upon the knob 59 on the outer end of pin 60 fixed in latch pin 55 to slidably extend through a double bayonet slot 61 which at its ends is formed with the laterally extending portions 62 and 63. The front end of latch pin 55 is rounded at 64 to form a cam-shaped nose that will act as a cam as it passes over the rear edge 65 of the top marginal portion 51 of the windshield so that when this latch pin reaches hole 52 in the windshield frame it will move a slight distance thereinto so as to initially hold these parts in approximately registered position. This slight movement of cam-nose 64 is permitted by a slight additional width of the slot ends 62 and 63 with relation to pin 60.

When the top 4 has been moved forwardly to its extreme position to clear the windshield frame it will be pulled downwardly by the hand of the operator until latch pin 55 enters hole 52 after which the knob 59 of pin 60 will be raised out of slot end 63 to permit the spring 58 to force the latch pin 55 forwardly into hole 52 until pin 60 strikes the forward end of slot 61 at which time the knob 59 will be moved downwardly in the end portion 62 of the slot to lock the top in position with relation to the windshield frame. As seen in Fig. 5 the front end of the top 4 is curved downwardly at 66 and when the top is locked to the windshield this front flange 66 will act to prevent entry of weather elements between the top 4 and the top edge of the windshield frame 51, which sealing action is facilitated by pressure of the inner surface of the front end of the top against the sealing strip 67 of rubber or the like. Extending along each of the longitudinal side edges of the top is a flange 67' which will serve as supports for fastening side curtains or the like to the car, when the top is up in its operative position, in the event of rain.

Extending rearwardly of the seat portion of the body 1 is an upper surface 68 of a general longitudinal curvature approximating that of the curvature of the lower edge of the side flanges 67' of the top. Formed to extend upwardly from this rearwardly extending portion 68 is a keeper flange 69 which is slightly curved in a lateral direction to be complemental to the lateral curvature of the rear edge of the top 4. As seen in Fig. 4 this upstanding keeper flange 69 is inclined forwardly at its upper end to form a space 70 within which the bead 71 at the rear edge of the top 4 is seated and held in place when the top is at its rearmost position when lowered so as to hold the top against rattling or undue looseness when the top is down and extended rearwardly.

From the above it is seen that when the top 4 is in the position shown in Fig. 1 it will serve as a top protector for the occupants of the seat 8. When it is desired to lower the top a suitably located switch (not shown) is manipulated to start the motor 29 in operation in a direction such that the worm gear 33 acting upon the teeth in the rack 34 will move the cover 4 rearwardly after the latch pin 55 has been released from hole 52 in the windshield frame. As explained earlier herein the spring 47, when latch pin 55 is released, will automatically cause the front edge of the top to move upwardly a distance sufficiently that the bottom edge of the front flange 66 will clear the top edge of the windshield frame sealing member 67. It is to be understood that the latch pin 55 will be released so that the front edge of the top will clear the windshield frame before the switch is manipulated for starting the motor 29. When the top has thus been moved rearwardly to an extent to clear the heads of the occupants of the seat and just before its rearward limit of movement is reached the motor 29 will be stopped and the hoist member 15 operated by a suitable valve or handle to lower the piston rod 16—18 and thus cause the top to move vertically in a downward direction. When the top comes in contact with the rearwardly extending portion 68 the hoist mechanism will be stopped and the motor 29 again started for operation in the same direction to cause the bead 71 on the rear edge of the top to move into the space 70 in the keeper flange 69 to hold the cover in this position, at which time the motor 29 will be stopped. The motor 29 may be a reversible motor so that when a switch controlling the same is operated the motor will rotate in the opposite direction to cause the top to move forwardly. Or if desired any conventional type of reversing clutch may be applied in the connection between the motor 29 and the worm gear 33.

Assuming that it is desired to again place the top in its operative upper position, the motor will be started in said opposite direction a slight amount to move the bead 71 out of the recess 70 of the keeper flange 69. As soon as the bead is moved out of said space 70 the motor will be stopped and the hoist mechanism again operated to elevate the piston rods 16—18 to raise the top to its uppermost position and the hoist then stopped. The motor 29 is then again started and the top moved to its maximum forward position with the flange 66 slightly in front of the windshield frame 51. As explained earlier herein the front edge portion of the top is, by the spring 47, held tilted upwardly a sufficient amount so that the lower edge of the flange 66 will clear the top edge of the windshield frame. The operator will then pull downwardly on the front edge of the top to move the top into the position shown in Fig. 6 at which time the top will be latched to the windshield frame as earlier explained.. It is thus seen that the top may be closed or opened with relation to the seat in accordance with the wishes of the operator.

While I have in the foregoing, described and shown the top as used in connection with a single seated vehicle or transportation device, I have shown in Fig. 9 a modification which is adaptable for a vehicle or transportation device having more than one seat. In the form shown in Fig. 9 the top is formed of a front section 72 and a rear section 73 the former having in its rear edge a bent-over portion 73' and the latter having in its front edge a downwardly and inwardly bent portion 74 so that when the top is extended into covering position these two portions will interlock to form a weather seal. Such weather seal may include U-shaped strips of rubber or other suitable material, or be otherwise arranged as desired, to keep out rain. Otherwise the construction and operation of the top in the form of Fig. 9 is substantially the same as that in the form of the preceding figures. In this modification when the top has been moved rearwardly through operation of the motor 29 the entire top will be moved rearwardly to its limit of movement, and the front section 72 then pushed rearwardly by the operator so that the yoke legs of the front section will telescope into complemental legs in the rear section or along the side thereof so as to make the collapsed top of substantially the same length as that of the form in the preceding figures, the action in opening and closing the top being in other respects the same as that heretofore described.

The top 4 is preferably formed of metal or other sturdy rigid material so as to protect the occupants of the seat from falling objects, as well as to enable the top to endure and satisfactorily operate for the life of the car or other transportation device to which it is attached.

Having described my invention, I claim:

1. In an automobile of the convertible type, a body having a seat portion, a windshield frame, a top-supporting frame vertically movable in the body, a connecting plate at the upper portion of the last mentioned frame and mounted for slight pivotal movement thereon, a top slidably mounted on said connecting plate for forward and rearward movement thereon, resilient means for normally holding the front end of the top raised to clear the top of said windshield frame as the top is moved forwardly, and a resilient detent in the front end portion of the top for latching the top to the windshield frame when the top is swung downwardly thereover.

2. In a transportation device of the type having a convertible top, a body having a seat and downwardly extending wells, a top-supporting frame mounted in said wells for up and down movement therein, a top slidably mounted on the upper portion of said top-supporting frame for movement forwardly and rearwardly thereon to cover and uncover the seat, said top when the seat is uncovered extending a substantial distance behind said frame, said top being rigid and at all times occupying an approximately horizontal position.

3. In a transportation device as claimed in claim 2, in which said body includes a windshield frame, and said top has a small pivotal movement on the top of the top-supporting frame of an amount so that the front of the top will clear the upper edge of the windshield frame as it moves thereover and then be movable downwardly against the windshield frame.

4. In a transportation device as claimed in claim 3, including spring means for holding said top in position to clear the windshield frame at all times except when pulled downwardly to bear thereagainst.

5. In an automobile of the convertible type, a body having a seat portion, a top-supporting frame vertically movable in straight lines in said body, a top longitudinally slidably mounted on the upper portion of said frame and movable in an approximately horizontal direction forwardly in front of said frame to cover said seat and movable in an approximately horizontal direction rearwardly to extend behind said frame to uncover said seat, power means for selectively moving said frame vertically upwardly and downwardly in the body, and power means for selectively moving said top forwardly and rearwardly of the frame with the top at all times in an approximately horizontal position.

6. An automobile as claimed in claim 5, including a plate pivotally mounted on the top-supporting frame adjacent its top, means for limiting the amount of pivotal movement of the plate to a slight amount, a guideway member fixed to said plate, and a guide rod longitudinally slidable in said guideway member and fixed at its ends to the respective end portions of the top.

7. In an automobile of the convertible type, a body having a seat and a well on each side of and to the rear of the seat, said wells being connected by a transverse slot, a top-supporting frame mounted in said wells and slot for vertical movement upwardly and downwardly therein, a pair of plates pivotally mounted one on each of the upper lateral sides of the frame, means for limiting the amount of pivotal movement of each of said plates to a slight amount, each of said plates having a guideway member fixed thereon, a top having fixed on its under surface a yoke member having a guide rod on each side of the top, said guide rods being respectively mounted for longitudinal sliding movement in said guideway members, said yoke member also having a longitudinally extending rack bar, and a reversible motor on the top-supporting frame having gear means engaging said rack bar for moving the top forwardly and rearwardly, said top when moving forwardly to cover said seat and when moving rearwardly to uncover said seat always moving at approximately right angles to the direction of movement of the top-supporting frame.

8. In a transportation device of the type having a convertible top, a body having a seat and a downwardly extending well on each side just to the rear of the seat, said wells being connected by a transverse slot in the body portion, a top-supporting frame vertically movable in said wells and slot for up and down movement therein, power means in the lower portion of each of said wells connected to the top-supporting frame for selectively moving the latter upwardly and downwardly, guideways in the upper end of said frame, a top having yoke legs fixed at their front ends to the front of the top in front of said guideways and fixed at their rear ends to the top behind said guideways, said yoke legs being slidable longitudinally in said guideways to move the top approximately horizontally to extend forwardly of the guideways to cover the seat when moved in one direction and to extend rearwardly of the guideways to uncover the seat when moved in the opposite direction, the amount of movement of the top forwardly and rearwardly of the guideways being more than one-half of the length of the top, the top always being in approximately horizontal position during vertical movement of the top-supporting frame and during longitudinal movement of the top.

HARRY F. GEORGE.

REFERENCES CITED

The following references are of record in the file of this patent:

UNITED STATES PATENTS

| Number | Name | Date |
|---|---|---|
| 487,544 | Simon | Dec. 6, 1892 |
| 1,272,539 | Saunders | July 16, 1918 |
| 1,306,836 | Perlman | June 17, 1919 |
| 1,940,444 | Burgman | Dec. 19, 1933 |
| 2,191,269 | Atwater | Feb. 20, 1940 |
| 2,221,460 | Simpson | Nov. 12, 1940 |
| 2,462,667 | O'Neal | Feb. 22, 1949 |

FOREIGN PATENTS

| Number | Country | Date |
|---|---|---|
| 681,119 | France | May 9, 1930 |